United States Patent [19]

Moss et al.

[11] Patent Number: 4,529,270

[45] Date of Patent: Jul. 16, 1985

[54] ELECTROMECHANICAL BISTABLE ARRANGEMENTS

[75] Inventors: Anthony R. L. Moss; Christopher J. Barrett, both of Cambridge, England

[73] Assignee: U.S. Philips Corporation, New York, N.Y.

[21] Appl. No.: 440,920

[22] Filed: Nov. 12, 1982

[30] Foreign Application Priority Data

Nov. 27, 1981 [GB] United Kingdom ............... 8135797

[51] Int. Cl.³ .......................... G02B 5/22; G02B 7/00; H02K 21/00
[52] U.S. Cl. .................................. 350/315; 350/318; 318/132; 318/128
[58] Field of Search ............... 350/318, 315, 269, 266, 350/486, 6.6; 318/128, 132

[56] References Cited

U.S. PATENT DOCUMENTS

| 3,267,808 | 8/1966 | Czekalla et al. | 350/316 |
| 3,459,976 | 8/1969 | Nyman | 318/132 |
| 4,033,693 | 7/1977 | Payrhammer et al. | 350/269 |
| 4,187,452 | 2/1980 | Knappe et al. | 350/6.6 |
| 4,287,457 | 9/1981 | Takemura | 318/132 |
| 4,415,231 | 11/1983 | Kaczensky et al. | 350/269 |

Primary Examiner—Jon W. Henry
Attorney, Agent, or Firm—Paul R. Miller

[57] ABSTRACT

A synchronous motor is adjustably positioned on a support plate by screws passing through slots in the support plate. An optical filter is attached to an arm which is secured to the rotor of the motor for horizontal rotation of the arm between two stable positions defined by stops so that the filter is held stable either in or out of the path of a light beam in a spectrophotometer, for example. The stops are spaced and positioned in relation to the stator poles of the motor such that application to two stator coils of the motor of one or the other of two predetermined discrete voltage codes will unambiguously drive the rotor in the direction of a predetermined one or the other of the stops toward a stable pole position of the motor corresponding to that code until movement is terminated by that stop.

6 Claims, 14 Drawing Figures

ELECTROMECHANICAL BISTABLE ARRANGEMENTS

This invention relates to electromechanical bistable arrangements in which a mechanical component may be positioned in either one of two stable positions by electrical control of an electromechanical transducer connected to the component.

Such bistable arrangements are used in spectrophotometers, in which the mechanical component includes an optical element to be positioned in either one of two stable positions with respect to the stationary position of a light beam through the spectrophotometer. The optical element may be a filter. Known arrangements for the bistable positioning of the optical element involve the use of a solenoid, or a direct current motor driven foward to a stop or in reverse to a stop, or a cam driven by a motor. A solenoid used for this purpose consumes a lot of current and is often unreliable. A direct current motor used in the way mentioned suffers from contact problems with its brushes when stalled in a repeatable position. A cam driven by a motor tends to involve an undesirably complex mechanism.

An object of the invention is to provide an arrangement in which at least some of these disadvantages are overcome.

According to the invention there is provided an electromechanical bistable arrangement as described in the first paragraph of this specification, characterised in that the electromechanical transducer is a synchronous motor having a permanent magnet rotor and in that two stops define the two stable positions of the mechanical component separated by a corresponding first angle of rotation of the rotor, the motor being such that in the absence of the stops it would be continuously drivable by repeated application to coil means associated with a stator of a sequence of codes of discrete voltages, each sequence stepping the motor through a number of stable pole positions corresponding to a second angle of rotation of the rotor, the first angle being less than the second angle and the stator and the stops being relatively adjustable to a position such that, when the mechanical component is anywhere between the two stops, application to the coil means of one or other of two predetermined codes of discrete voltages of the sequence will unambiguously drive the rotor in the direction of a predetermined one or other of the stops towards a stable pole position corresponding to that code until movement is stalled by that stop. The motor may be an electrically reversible motor with the coil means having one coil associated with a set of main stator poles and another coil associated with a set of auxiliary stator poles such that four said stable pole positions correspond to the second angle of rotation, and in which the sequence of codes of discrete voltages corresponds to square waveform voltages applied to the two coils in phase quadrature. Synchronous motors have no brushes and so no problems arise from using them in a stalled condition. Because of their use in mass-produced articles, synchronous motors are particularly cheap. Also, synchronous motors have shafts which are mounted in bearings enabling the mechanical component requiring good reproducibility of movement and positioning to be cheaply mounted.

The invention will now be described in more detail, with reference to the accompanying drawings, in which:

FIGS. 4 to 9 show parts of the arrangement of FIGS. 1 to 3, wherein:

FIG. 4 shows an end view of a synchronous motor having a boss on its shaft,

FIGS. 5 and 6 show plan and side views of an arm with a filter mounted thereon,

FIG. 7 shows a plan view of a support plate, and

FIGS. 8 and 9 show end and plan views of a stop plate providing two stops,

Figure 1:
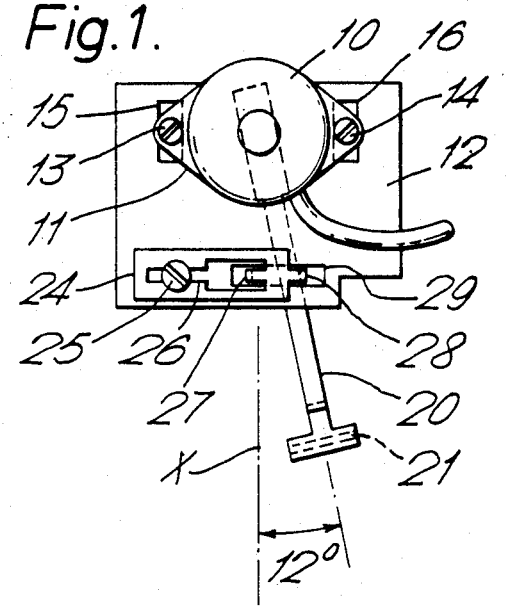
FIGS. 1, 2 and 3 show respectively plan, end and side views of an electromechanical bistable arrangement for use in a spectrophotometer according to the invention, the arrangement incorporating an optical filter which may be positioned either in or out of the path of a light beam through the spectrophotometer.
Figure 2:
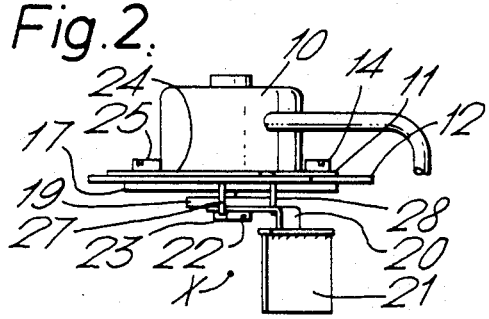
Figure 5:
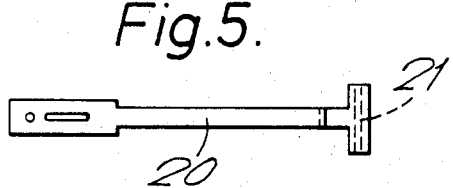
Figure 6:
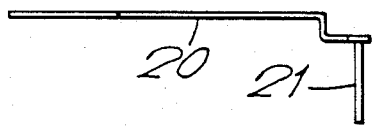
Figure 3:
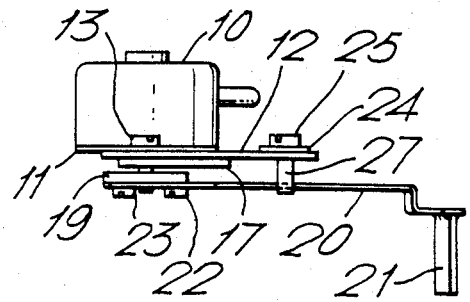
Figure 4:
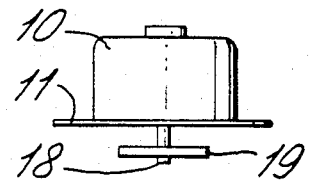
Figure 7:
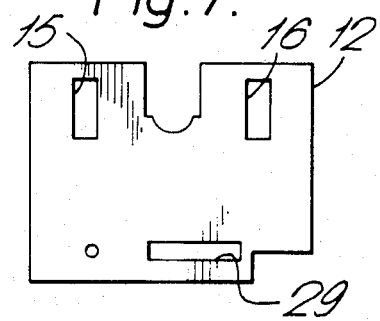
Figure 9:
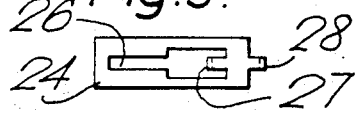
Figure 8:
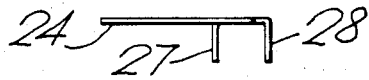
Figure 10:
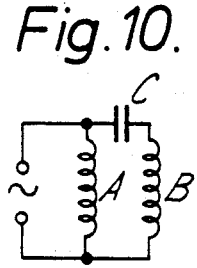
Figure 13:
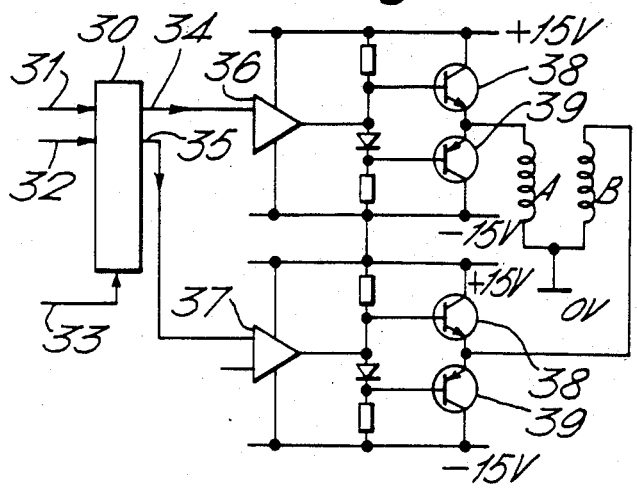
Figure 11:
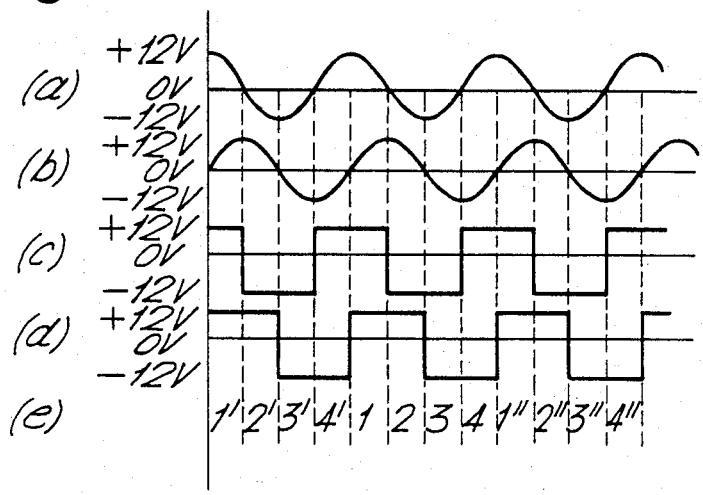
Figure 12:
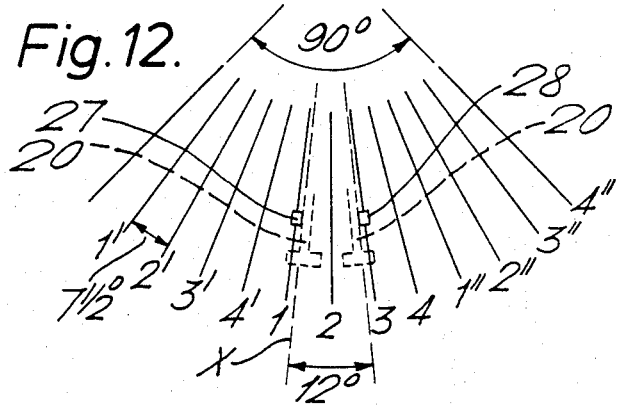
Figure 14:
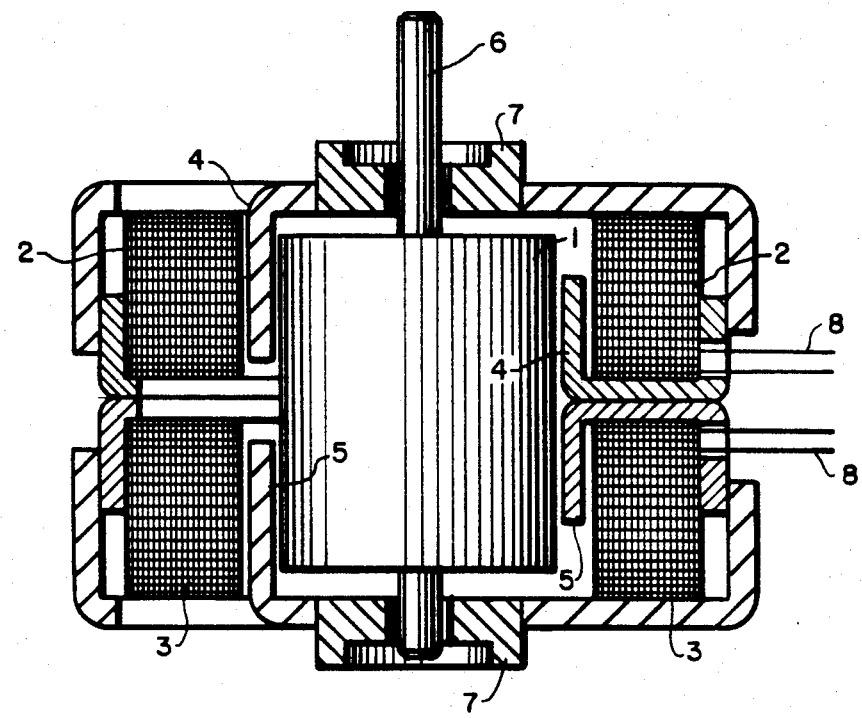

FIG. 10 shows the conventional circuit configuration, not used according to the invention, of the stator coils of the motor which is part of the arrangement shown in FIGS. 1 to 3, FIG. 11 shows voltage waveforms which could be applied to the coils of the motor of FIGS. 1 to 3 to continuously drive the motor in a smooth or stepped manner, FIG. 12 shows angularly successive stable pole positions of the rotor of the motor of FIGS. 1 to 3, FIG. 13 shows an electrical control circuit connected to the stator coils of the motor of FIGS. 1 to 3 which can be used to operate that motor in the bistable arrangement shown, and FIG. 14 shows a motor structure used in the present invention.

Referring now to FIGS. 1 to 9, a bistable electromechanical arrangement includes a synchronous motor 10 having a mounting plate 11 by which it rests on a support plate 12 and the motor 10 is secured to the support plate 12, by two screws 13, 14 which pass through holes in the motor plate 11 and slots 15, 16 in the support plate 12 into a nut plate 17. The shaft 18 of the motor 10 has a circular boss 19 force fitted thereon, and an arm 20 having an optical filter 21 mounted thereon with glue is secured to the boss 19 by two screws 22, 23. A stop plate 24 rests on the support plate 12 and is secured thereto by a screw 25 passing through a slot 26 in the stop plate 24 and into the support plate 12. The stop plate 24 provides two stips 27, 28 which extend through a slot 29 in the support plate 12.

In use in spectrophotometer the support plate 12 is held by a bracket so that the motor shaft 18 is vertical, and operation of the motor 10 in the manner to be described below rotates the arm 20 horizontally between two stable positions defined by the stops 27, 28 so that the filter 21 is held stable either in or out of the path of a light beam X through the spectrophotometer.

In the arrangement shown for use in an ultraviolet-visible spectrophotometer, the light beam X is 8 mm square in cross-section, the width of the filter 21 is 16 mm, the radial distance of the filter 21 from the motor shaft 18 is 70 mm and the angle of rotation of the arm 20 between the two stops 27, 28 is 12°. The size and weight of the filter arm 20 and filter 21 and its arrangement for rotation in the horizontal plane are such that the bearings of the motor shaft can provide the bearings for the rotational movement of the filter arm, and furthermore the required angle of rotation of the filter arm can be provided directly by the same angle of rotation of the motor rotor without the need for intermediate gearing.

A synchronous motor of suitable design, size and power for use as the motor 10 is catalogue number 990411132511 described on page A79 of the Philips Data handbook, Electronics components and materials, Part 6, May 1981. This is an electrically reversible synchronous motor, such as seen in FIG. 14, having a permanent magnet rotor 1, one coil 2 associated with a set of main stator poles 4 and another coil 3 associated with a set of auxiliary stator poles 5. The permanent magnet rotor 1 is provided on a motor shaft 6 mounted through bearings 7. Leads 8 extend to the one coil 2 and the other coil 3. Each set of stator poles has 12 pole pairs and the motor is designed to operate from a 24 volt source so that with conventional operation at 50 Hz mains voltage frequency in the absence of the stops 27, 28 of the arrangement described above with respect to FIGS. 1 to 9 the rotor would traverse an angle of 30 degrees for each voltage cycle and the motor would have a speed of 250 revolutions per minute.

FIG. 10 shows the conventional circuit configuration, not used according to the invention, of two stator coils A and B of the motor 10. The coils are connected in parallel and a capacitor C is provided for the application of sine wave alternating drive voltage to the coils in phase quadrature as shown by the waveforms (a) and (b) of FIG. 11 resulting for conventional operation in a continuous smooth drive of the motor. The motor 10 could instead be driven, again in the absence of the stops 27, 28, in a continuous but stepped manner by application to the stator coils of the square waveform voltages (c) and (d) shown in FIG. 11 in which voltage levels equal to the positive and negative peak values of the waveforms (a) and (b) are maintained constant for the same respective positive and negative half cycles. The square waveform voltages shown in FIGS. 11 (c) and (d) can be described as a repeated sequence of four codes of discrete voltages in which each sequence of codes is as shown in the table below:

| Code | Voltage to coil A | Voltage to coil B |
|---|---|---|
| 1 (1',1") | +12 volts | +12 volts |
| 2 (2',2") | −12 volts | +12 volts |
| 3 (3',3") | −12 volts | −12 volts |
| 4 (4',4") | +12 volts | −12 volts |

FIG. 11(e) identifies three repeated sequences of these four codes as 1'2'3'4' 1234 1"2"3"4". FIG. 12 shows the corresponding stepped angular positions of the motor rotor for these three sequences which would take the rotor in the absence of the stops 27, 28 through 90 degrees in total with a 30 degree rotation of each sequence and a 7½ degree step for each of the four code changes within each sequence. As stated above, the motor has two sets of 12 stator pole pairs which provides a total of 48 stator poles having a 7½ degree spacing. With any one of the four distinct discrete voltage codes applied to the stator coils, in the absence of the stops 27, 28 the motor would be held fixed in a corresponding stable pole position, that is to say a stable position of the rotor with respect to the stator poles.

FIG. 13 shows an electrical control circuit connected to the stator coils A and B and which can provide the four discrete voltage codes described above to the coils A and B. This circuit could be used to repeatedly apply the sequence of codes to continously step the motor in either direction in the absence of the stops 27, 28, and furthermore it can be used in the manner to be described below to apply a selected two or three codes from a single sequence to operate the motor of the bistable arrangement shown in FIGS. 1 to 9. A data latch 30 can be an output port connected to a microprocessor and two bits of data are used and applied to the data inputs 31, 32 together with a timing signal applied to the timing input 33. Signals at TTL voltage levels from the outputs 34, 35 of the data latch 30 are applied to respective comparators 36, 37 which convert the TTL voltage levels to ±12 volts. The comparators 36, 37 cannot supply sufficient current to drive the coils A and B and so the output of each comparator is current boosted by a discrete complementary transistor pair 38, 39 for application to the coils A and B. The data latch 30 could be replaced by any logic function that produces the required four codes.

Referring now back particularly to FIGS. 1 and 12, the stops 27, 28 are placed so as to limit movement of the arm 20 on which the filter 21 is mounted to an angle of 12 degrees of rotation of the rotor of the motor 10. When the motor stator and the stops 27, 28 have been relatively adjusted by the initialisation process to be described below, the stops 27, 28 are symmetrically placed 6 degrees on either side of the pole position 2 and hence are symmetrically within the 15 degree angle subtended by pole positions 1 and 3. If then the arm 20 is anywhere between the two stops 27, 28 application of the discrete voltage code 1 (+12 volts, +12 volts) or 3 (−12 volts, −12 volts) to the stator coils A and B of the motor 10 will unambiguously drive the motor rotor and hence the arm 20 in the direction of the stop 27 or the stop 28 respectively towards the stable pole position 1 or 3 respectively corresponding to that code until movement is stalled by that stop. Thus if the arm 20 is anywhere between the stops 27, 28 and the discrete voltage code 1 is then applied to the motor coils, the arm will tend to move to a stable pole position corresponding to that code. Even if the arm 20 is against the stop 28 before application of the code 1 it is 13½ degrees away from the pole position 1 and 16½ degrees away from the pole position 1". The arm 20 will therefore move unambiguously towards the pole position 1 until stalled by the stop 27, in which position it is stable. With the voltage code 1 continuously applied the arm 20 will remain stable against the stop 27 and if it is accidentally deflected away from that stop, even as far as the stop 28, it will return to the stop 27. If the voltage code 1 is then changed to the voltage code 3, the arm 20 is nearer to the stable pole position 3 than to the pole position 3' and so it will move towards the pole position 3 until it is stable against the stop 28 with the motor stalled.

Since the volages on the stator coils A and B are reversed together using codes 1 and 3 as described above, this one step operation of the bistable arrangement could be achieved with the control circuit of FIG. 13 modified to provide a data latch with a single input and a single output and only one comparator driver stage. However it is possible to operate the bistable arrangement of FIGS. 1 to 9 using the control circuit of FIG. 13 to take the arm 20 between the two stops 27, 28 in two steps using three discrete voltage codes rather than in one step using two discrete voltage codes as has just been described. Thus the code 2 may be used to take the motor rotor to the corresponding stable pole position 2 as shown in FIG. 12 as an intermediate step. Use of this intermediate step could enable a motor of given power in relation to the friction within the motor bearings to move a heavier filter arm and filter between the two stops defining the bistable positions.

Referring back to FIGS. 1 to 9 a suitable initialisation process is as follows. Accurate positioning of the arm 20 with respect to the light beam X through the spectrophotometer is first ensured by loosening the screw 25, moving the stop plate 24 by means of its slot 26 until the stops 27, 28 are positioned such that with the arm 20 against the stop 27 the filter 21 is centrally in the light beam X, and then tightening the screw 25. Accurate and correct positioning of the motor stator relative to the stops 27, 28 is then ensured by applying the discrete voltage code 1 to the motor coils, then loosening the two screws 13, 14, then rotating the motor 10 by moving the screws 13, 14 along the slots 15, 16 in the support plate 12 until the filter 21 is centrally in the light beam X with the arm 20 against the stop 27 in its natural position but when the arm 20 is deflected to the stop 28 with the code 1 still applied it springs back to the stop 27, then tightening the screws 13, 14, then applying the discrete voltage code 3 to the motor coils and checking that the arm 20 is against the stop 28 in its natural position and if the arm 20 is deflected to the stop 27 with the code 3 still applied it springs back to the stop 28.

Some possible modifications within the scope of the invention of the bistable arrangement described above with reference to FIGS. 1 to 13 are as follows. Using the same motor 10 as described above having a step of 7½ degrees between the stable pole positions of each set of four stable pole positions, the stops defining the bistable positions of the arrangement could be within two successive stable pole positions so as to define an angle of rotation of the motor rotor of say 6 degrees between the two stable positions. For example, the stop could be between the pole positions 1 and 2 as shown in FIG. 12 and bistable operation could be effected using either code 1 or code 4 to hold the rotor against the stop nearest pole position 1 and using either code 2 or code 3 to hold the rotor against the stop nearest pole position 2. Whatever angle of rotation of the motor rotor is used between the bistable positions, the corresponding angle of rotation of a component connected to the rotor could be amplified by suitable gearing if the power of the motor is suitable in relation to the weight and size of the component and its gearing to be moved. The optical element to be positioned in a bistable manner with respect to the stationary position of a light beam through a spectrophotometer could be other than a filter as shown in FIGS. 1 to 9. For example the optical element could be a monochromator slit assembly having two different size slits which are to be alternatively positioned in the path of the light beam. In this case the component connected to the rotor could be sufficiently balanced to be rotatable in a vertical plane in contrast to the horizontal plane rotation of the filter arm shown in FIGS. 1 to 9. It is furthermore envisaged that a bistable arrangement according to the invention could be used for bistable positioning of mechanical components other than optical elements with respect to a stationary light beam in a spectrophotometer; for example for moving a chart recorder pen into and out of its operative position.

We claim:

1. An electromechanical bistable arrangement comprising a synchronous motor having a permanent magnet rotor, said motor being an electrically reversible motor having a first coil and a set of main stator poles and a second coil and a set of auxiliary stator poles, an arm structure rotating with said rotor and extending beyond said motor, two stop members defining two stable positions for said arm structure, said two stable positions defining a first angle of rotation of said rotor means for applying a sequence of codes or discrete voltages to said motor for driving said motor, each of said sequence of codes stepping said motor through a number of stable pole positions at a second angle of rotation of said rotor in the absence of said two stop members, said first angle of rotation being smaller than said second angle of rotation, wherein four of said stable pole positions define said second angle of rotation, wherein said stop members are relatively adjustable such that when said arm structure is between said two stop members, application of a predetermined one of said sequence of codes will unambiguously drive said rotor in a direction of one of said two stop members toward one of said two stable positions until movement is stopped by said one of said two stop members, and wherein said sequence of codes is formed by square waveform voltages applied to said first and second coils in phase quadrature.

2. A bistable arrangement according to claim 1, wherein said arm structure is connected to said rotor such that said arm structure rotates at an angle of rotation between said two stop members equal to said first angle of rotation.

3. A bistable arrangement according to claim 2, wherein said arm structure includes an optical element movable with said arm structure, said optical element being positioned at one of said two stable positions in a light beam.

4. A bistable arrangement according to claim 3, wherein said optical element is a filter.

5. A bistable arrangement according to claim 1, wherein said arm structure includes an optical element movable with said arm structure, said optical element being positioned at one of said two stable positions in a light beam.

6. A bistable arrangement according to claim 5, wherein said optical element is a filter.

* * * * *